United States Patent [19]

Kyomasu et al.

[11] Patent Number: 4,866,527
[45] Date of Patent: Sep. 12, 1989

[54] IMAGE SENSOR WITH NON-DESTRUCTIVE READOUT

[75] Inventors: Mikio Kyomasu; Seiichiro Mizuno, both of Hamamatsu, Japan

[73] Assignee: Hamamatsu Photonics K.K., Shizuoka, Japan

[21] Appl. No.: 135,360

[22] Filed: Dec. 21, 1987

[30] Foreign Application Priority Data

May 15, 1987 [JP] Japan .................................. 62-118279

[51] Int. Cl.$^4$ ............................................... H04N 3/14
[52] U.S. Cl. ................................................. 358/213.19
[58] Field of Search ...................... 358/213.19, 213.12, 358/213.11, 228; 250/578

[56] References Cited

U.S. PATENT DOCUMENTS 4,563,708  1/1986  Ishibashi et al. ............... 358/213.19
4,573,077  2/1986  Imai ..................................... 250/578

Primary Examiner—Jin F. Ng
Assistant Examiner—Stephen Brinich
Attorney, Agent, or Firm—Finnegan, Henderson, Farabow, Garrett, & Dunner

[57] ABSTRACT

An image sensor particularly suitable for use in an autofocus camera includes a light measuring means, a capacitance element for accumulating picture element information which is photoelectrically converted by the light measuring means, a source follower circuit that outputs as picture element information the voltage across the capacitance element with low output impedance, a switching element for reading out the picture element information from the source follower to a video line, and a load element for outputting the output voltage of the source follower to a monitor line. The output voltage from the source follower to the monitor line is compared with a reference voltage which has been preset to a desired output voltage level. The light measuring operation of the light measuring means is caused to stop when the output voltage of the source follower is equal to the reference voltage thereby storing and maintaining across the capacitance element the picture element information which has the desired voltage level.

5 Claims, 4 Drawing Sheets

IMAGE SENSOR WITH NON-DESTRUCTIVE READOUT

FIELD OF THE INVENTION

The present invention relates to an image sensor and, more specifically, to an image sensor that can be used as an autofocus sensor in a single-lens reflex camera.

BACKGROUND OF THE INVENTION

Image sensors have been used as sensors for autofocusing in single-lens reflex cameras. It is desirable, from the standpoint of users that an image sensor automatically provides a manageable output voltage level. FIG. 3 shows a conventional image sensor that automatically sets a desired level for the video output. The image sensor 50 shown in FIG. 3 is arranged to detect the desired output voltage level of the video signal or the picture element information from a photodiode array 51 by detecting the difference between the photosensitivity of a monitor photodiode 54A and the photosensitivity of a photodiode array 51.

More specifically, in the image sensor 50 the photodiode array 51 performs photoelectric conversion. A shift gate 53 controls the timing for transferring the picture element information from the photodiode array 51 to a charge coupled device (CCD) 52 and a video output means 54 accumulates and outputs picture element information from the charge coupled device 52. The image sensor 50 is further provided with a monitor photodiode 54A having a photosensitivity of n times that of each photodiode in the photodiode array 51. A monitor output means 55 outputs the monitor output voltage from the monitor photodiode 54A and monitor compensation output means outputs a monitor compensation output signal.

The charge accumulated in respective photodiodes of the photodiode array 51 and the charge accumulated in the monitor photodiode 54A are reset by a reset gate 57. The video output means 54, the monitor output means 55, and the monitor compensation output means 56 are of the same construction, and include respective capacitance elements 58, 59, and 60 that are provided with a reference voltage Vref through switching elements 61, 62, and 63, respectively. The information accumulated across the respective capacitance elements 58, 59, and 60 are outputted to the outside via buffer circuits 64, 65, and 66, respectively. With the image sensor 50 thus arranged, a reset signal RST is applied to the reset gate 57 to open the reset gate 57 to reset charge accumulated in each photodiode in the photodiode array 51 and the monitor photodiode 54A. Further, the reset gate 57 opens to cause the switching elements 62 and 63 to be on, and the voltages across capacitance elements 59 and 60 of the monitor output means 55 and the monitor compensation output means 56 are initially set to the reference voltage Vref.

A first clock signal $\phi_1$ of the charge coupled device 52 causes the switching element 61 to be on and then the voltage across capacitance element 58 of the video output means 53 is maintained at the reference voltage Vref. When the reset gate 57 closes, an amount of light incident upon each photodiode of the photodiode array 51 is photoelectrically converted into a video signal or picture element and is accumulated in the photodiode.

Since the monitor photodiode 54A has a photosensitivity n times higher than each photodiode of the photodiode array 51, a charge approximately n times larger than the output of each of the photodiodes of the photodiode array 51 is accumulated in the monitor photodiode 54A. Thus, the voltage across the capacitance element 59 of the monitor output means 55 decreases rapidly. The output voltage of the monitor output MOUT, which is read out via a buffer circuit 65, is detected, and the time required for this output voltage to reach a desired level is used for computing the time required for the photodiode array 51 to accumulate charge, for example, a period n times longer.

When the computed time period has lapsed, respective photodiodes of the photodiode array 51 can be expected to have been charged sufficiently to provide a desired voltage level. The shift gate is opened to transfer the charge accumulated in respective photodiodes to the charge coupled device 52. The charge coupled device 52 causes the desired output voltage level to be output in the form of the voltage across the capacitance element 58. Thus, a picture element or video output is indicated by the value VOUT via the buffer circuit 64. In this manner, with the image sensor 50 shown in FIG. 3, the monitor output MOUT from the monitor photodiode 54A is detected to compute, on the basis of the time when the output voltage reaches the desired level, the time required for the capacitance element 58 to be charged up. In this manner, the desired level of the video output may be obtained.

The image sensor 50 of FIG. 3 is shown in FIG. 4 as being arranged such that the photodiode array 51 is disposed at the center and the monitor photodiode 54A is disposed at the periphery. The image sensor 50 is generally used in combination with optical systems as shown in FIG. 5. The optical system in FIG. 5 consists of a mount lens 71, a half mirror 72, a mirror 73, a slit 74, a focus lens 75, and a dual focus lens 76. With such an optical system, the light through the mount lens 71 passes through the half mirror 72 and the mirror 73, and a slit image is formed by the slit 74. The slit image passes through the focus lens 75 and the dual focus lens 76 to focus on the image sensor 50. An equal energy plane of the slit image of luminous flux is designated by SB in FIG. 4. Therefore, the isoenergy plane covers the photodiode array 51 but does not completely cover the monitor photodiode 54A. This means the isoenergy plane varies, leading to inaccurate detection of the output voltage level of the video signal from the photodiode array 51 on the basis of monitor output MOUT from the monitor photodiode 54A.

On the other hand, if the equal energy plane is enlarged to define a wider area to encompass the monitor photodiode 54A, then the slit image is enlarged and the energy density of the light decreases. This causes another problem in that higher sensitivity or better S-N ratio is further required to maintain necessary total sensitivity or S-N ratio of the video signal output.

OBJECTS AND SUMMARY OF THE INVENTION

An object of the present invention is an image sensor that can accurately detect the output of a video signal.

Another object of the present invention is an image sensor with improved sensitivity.

A further object of the present invention is an image sensor for providing a video signal output with an improved signal-to-noise ratio.

These and other objects are accomplished by an image sensor comprising a detector cell for photoelectrically generating a voltage corresponding to a picture element, for storing the voltage, and for outputting a signal corresponding to the stored voltage, means for controlling the operation of the detector cell by comparing a reference voltage to the output signal, and means for repeatedly reading out the stored voltage of the detector cell.

BRIEF DESCRIPTION OF THE DRAWINGS

The manner by which the above objects and other objects, features, and advantages of the present invention are attained will become fully apparent from the following detailed description and the accompanying drawings, wherein.

DETAILED DESCRIPTION

In the present invention, a reference voltage is set to, for example, a desired output voltage level. A detector cell of a type in which picture element information is stored and maintained in such way that the information can be repeatedly read out is provided to perform light measurement operations during which the output voltage from the detector cell is frequently compared with the reference voltage. When the output from the detector cell is equal to the reference voltage, it is determined that the picture element of the desired output voltage level is accumulated in the detector cell, and then the detector cell is caused to stop its light measurement operation. Thus, the picture element information having the desired output voltage level is stored and maintained in the detector cell, and this information can be read out, for example, to a video line.

Figure 1:
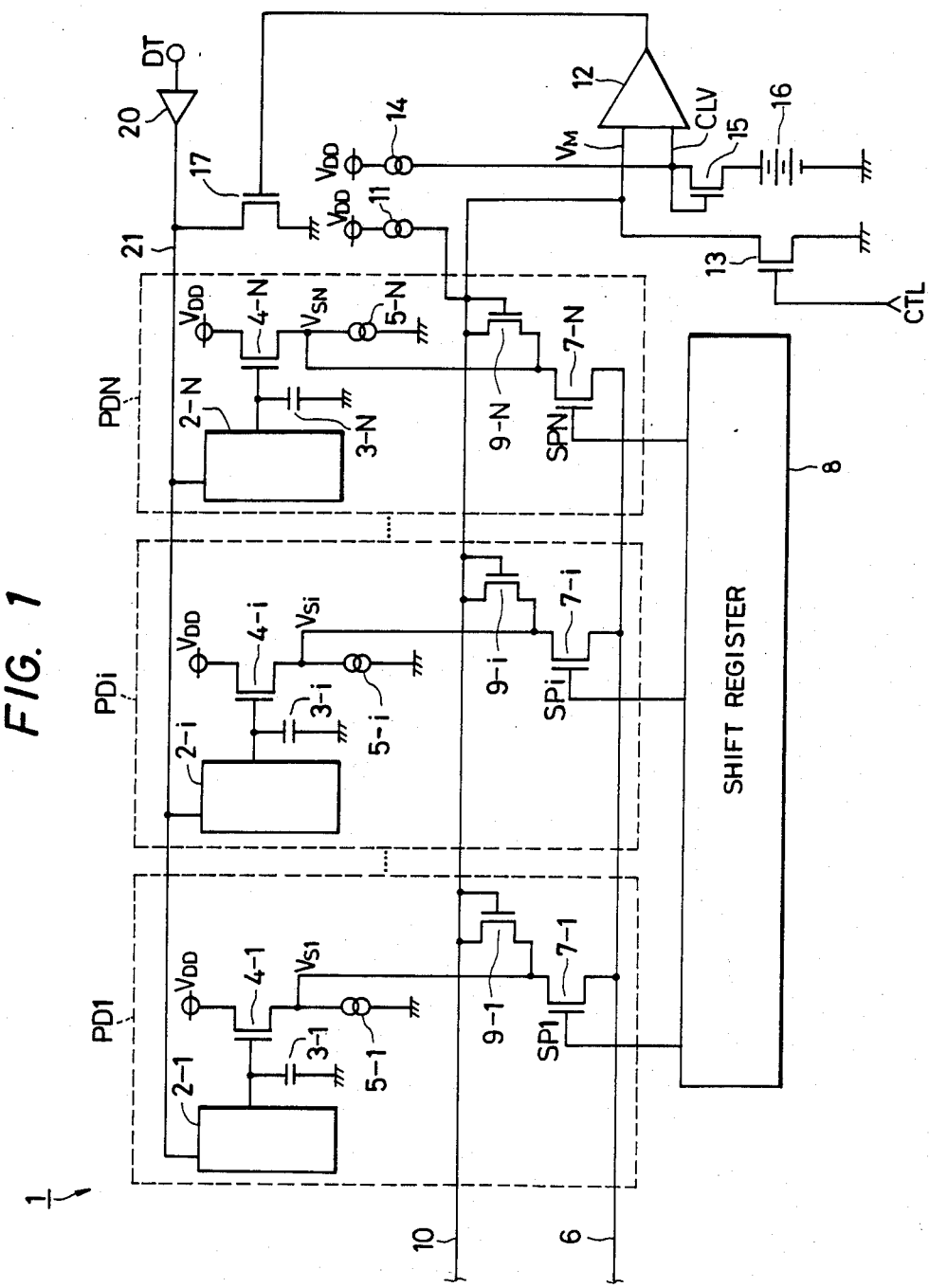
FIG. 1 is a schematic diagram of the image sensor of the present invention.

FIG. 1 shows an embodiment of an image sensor 1 according to the present invention. The image sensor shown in FIG. 1, unlike CCD image sensors or conventional image sensors, comprises a MOS image sensor, in which a video output signal is stored and maintained. In FIG. 1, the image sensor 1 is formed of a plurality of detector cells PD1 to PDN. Each cell, PDi, among the detector cells PD1 to PDN, is provided with a light measuring means 2-i; a capacitance element 3-i that accumulates charge representing the intensity of the picture element or the video signal photoelectrically converted by the light measuring means 2-i; a MOS transistor 4-i having a gate that receives the voltage of the capacitance element 3-i; a constant current source 5-i constituting a source follower circuit together with a MOS transistor 4-i; and a switching element 7-i formed of a MOS transistor that controls the reading out of the value of the picture element or the voltage across the capacitance element 3-i, which is drawn via the source follower consisting of the MOS transistor 4-i and the constant current source 5-i. The voltage across the capacitance element 3-i drawn from the source follower circuit is adapted to be outputted to a monitor line 10 via a monitor transistor 9-i formed as a MOS transistor.

The light measuring means 2-i is provided with a photodiode (not shown), and a control means (buffer 20 and data line 21) that controls accumulation of picture element information, photoelectrically converted in the photodiode, in the capacitance element 3-i by means of a data signal DT applied through the buffer 20 and data line 21. The output voltage of the source follower circuit is equal to Vsi when the data signal DT is not applied. The gate of a switching element 7-i receives a read out signal SPi from a shift register 8. Further, the voltage across the capacitance element 3-i or the picture element in the detector cell PDi will not be dissipated but will remain stored so that the voltage can be read out repeatedly even when it is read out from the switching element 7-i in response to the read out signal SPi from the shift register 8.

Figure 3:
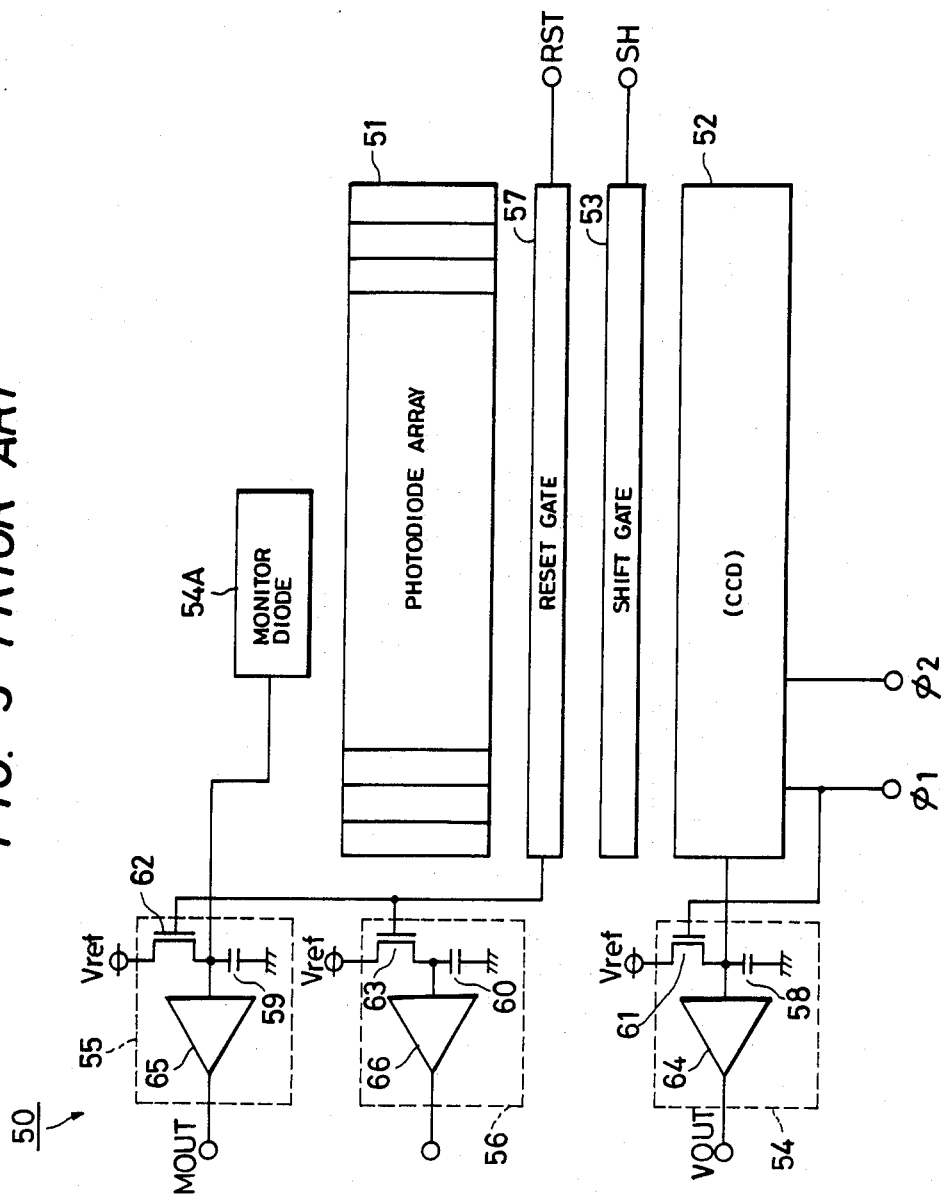
FIG. 3 is a schematic diagram of a conventional image sensor.
Figure 4:
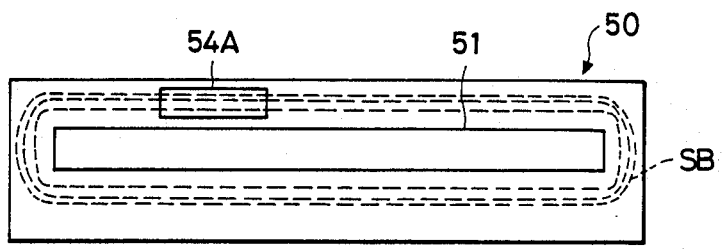
FIG. 4 is a top view of the image sensor of FIG. 3.
Figure 5:
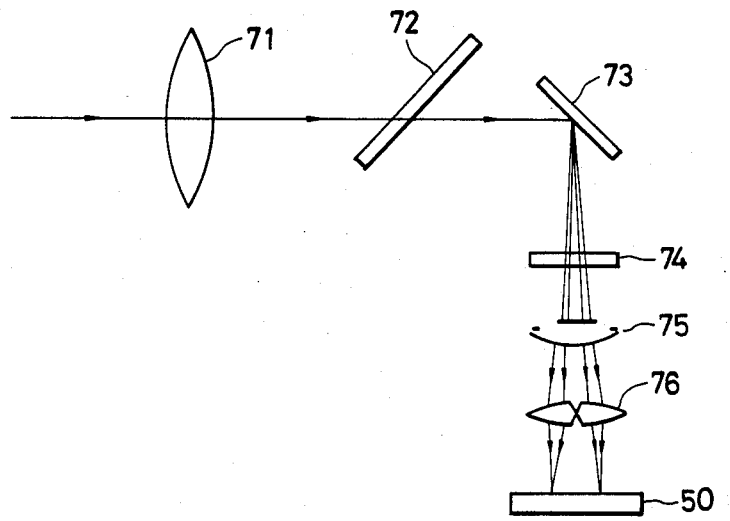
FIG. 5 is a schematic illustration of an optical system in which image sensors are used.

The description so far has been given with regard to one of the detector cells PDi, although other detector cells PD1 through PDN are of the same arrangement. A photodiode array corresponding to the array 51 in FIG. 3 is formed of the photodiodes of the light measuring means 2-1 through 2-N of a plurality of detector cells PD1 through PDN. The monitor line 10 is pulled up to a voltage VDD through a constant current source 11. The picture elements which are outputted to the monitor line 10 from the monitor transistors 9-1 to 9-N, are fed to one of the input terminals of a comparator 12, which in turn may be grounded through a MOS transistor 13 for controlling the comparator 12. The other input terminal of the comparator 12 is pulled up to the voltage VDD through a constant current source 14 similar to the constant current source 11, and is further connected to a reference source 16 via a MOS transistor 15.

The transistor 15 acts to apply a voltage, with a voltage drop equal to that of the transistors 9-1 to 9-N, and is lower than the voltage of the reference source 16 to the other input terminal of the comparator 12. In other words, the minimum output voltage of the monitor transistors 9-1 to 9-N is applied as a reference voltage to the other terminal of the comparator 12. Further, the output terminal of the comparator 12 is connected to the data line 21 via a MOS transistor 17 for data control.

With the image sensor 1 thus arranged, the control signal CTL is first set to a low level to turn off the MOS transistor 13 for controlling the comparator 12. With this condition, a current Ii(1≦i≦N) flows through the monitor transistors 9-1 to 9-N of a plurality of detector cells PD1 to PDN, respectively via the monitor line 10. Since the output of the source followers of respective detector cells PD1 to PDN is Vsi (1≦i≦N) when the data control signal DT is not providing an input, the value of the input voltage $V_M$ to the monitor line 10 or to the other input terminal of the comparator 12 is expressed by the following equation:

$$I = \sum_{i=1}^{N} Ii = \sum_{i=1}^{N} (\beta/2)(V_M - V_{Si} - V_{TH})^2 \quad (1)$$

where I is the current from the constant current source 11, $\beta$ is a constant that is determined by the channel width and so on of the MOS monitor transistors 9-1 to 9-N, and $V_{TH}$ is the threshold voltage of respective monitor transistors 9-1 to 9-N.

Figure 2:
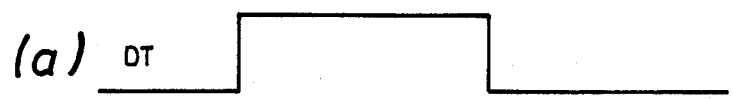
FIGS. 2(a), 2(b), and 2(c) are timing diagrams for illustrating the operation of the image sensor of FIG. 1.
Figure 2:
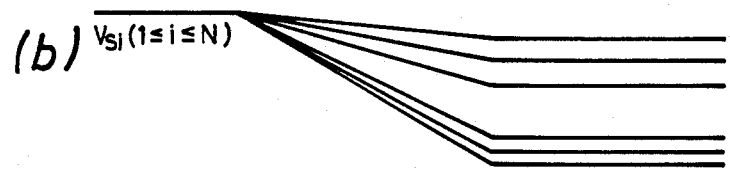
Figure 2:
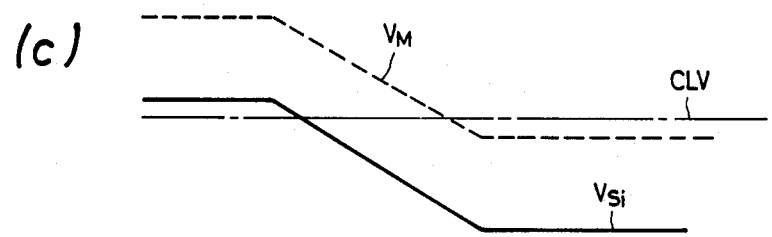

When the data signal DT goes high as shown in FIG. 2(a), light measurement is carried out by the light measuring means 2-1 to 2-N in respective detector cells PD1 to PDN to accumulate for the picture elements corresponding capacitance levels in respective capacitance elements 3-1 to 3-N. Thus, the voltages across the capacitance elements 3-1 to 3-N decrease. The drop or the voltage across the capacitance elements 3-1 to 3-N decreases at an increasing rate as the amount of light received by the photodiodes increases. In connection with this, the outputs of the source followers of the detector cells also decrease to $V_{si}$ as shown in FIG. 2(b). Thus, the voltage $V_M$ of the monitor line 10 decreases with a relation as expressed in Eq. (2), as shown in FIG. 2(c), with the decreasing output voltage $V_{si}$ of the source follower circuit.

$$I = \sum_{i=1}^{N} (\beta/2)(V_M - V_{Si} - V_{TH})^2 \quad (2)$$

Monitor transistors receiving a lower level of light will be substantially turned off. Thus, the voltage $V_M$ is governed primarily by monitor transistors corresponding to photodiodes that receive a large amount of light. On the other hand, the voltage of the other input terminal of the comparator 12 is maintained at the reference voltage as shown in FIG. 2(c), i.e., the level CLV, with the aid of the reference source 16 and the MOS transistor 15. When the voltage $V_M$ at the one input of the comparator 12 decreases to the level CLV, a signal is outputted from the output terminal of the comparator 12 to turn on the transistor 17 for data control. Since the current due to the data control signal DT flows into the data control transistor 17 through the buffer 20 and the data line 21 when the data control transistor 17 is on, the data signal DT is no longer applied to respective light measuring means 2-1 to 2-N thereby stopping the light measuring operation of respective light measuring means 2-1 to 2-N to store the required picture elements across the capacitance elements 3-1 to 3-N.

Setting the voltage of one input terminal of the comparator 12, i.e., the level CLv, to a desired output voltage level, makes it possible to store and maintain across the capacitance element the picture elements that bear the desired output voltage level when the voltage $V_M$ of the monitor line 10 reaches a desired output voltage level.

Then the control signal CTL is set to a high level to turn on the MOS transistor 13 for controlling the comparator thus allowing all current I from the constant current source 11 to flow into the MOS transistor 13 and effectively disconnect the monitor line 10 from the comparator 12. In this condition, detector cells storing picture element information which have reached the desired level as be read out in sequence by applying the read out signal SP1 to SPN from the shift register 8 to the switching elements 7-1 to 7-N in sequence.

As described above, according to the present invention, the output voltage of each of the detector cells is arranged to be directly monitored, in a manner that requires no additional photodiodes. The desired output voltage level of the video signal or the picture element information can be detected accurately without causing lower energy density of the light, thereby improving sensitivity and the S-N ratio of the video signal output.

What is claimed is:

1. An image sensor comprising:
    a detector cell including light measuring means for measuring the intensity of light over a measuring period, said detector cell photoelectrically generating a voltage corresponding to a picture element, storing said voltage, and outputting a signal corresponding to said stored voltage;
    means for controlling the operation of said detector cell by comparing a reference voltage to said output signal; and
    means for repeatedly reading out said stored voltage of said detector cell after said measuring period.

2. An image sensor according to claim 2, wherein said light measuring means are photoelectric light measurement means for generating a conversion signal having a level corresponding to the intensity of light received thereby; and
    said detector cell further comprises
        a capacitance element for accumulating a charge level corresponding to the level of said conversion signal, said charge level representing said picture element;
        a source follower circuit for outputting as picture element data said charge level of said capacitance element;
        a monitor line; and
        a load element for outputting said picture element data to said monitor line.

3. An image sensor according to claim 2, wherein said means for controlling the operation of said detector cell comprises:
    a comparator having a first input terminal, a second input terminal, and an output terminal;
    means for providing said reference voltage to said second input terminal;
    means for connecting said first input terminal to said monitor line, said output terminal generating a first value to enable said detector cell to generate said voltage when said picture element data on said monitor line is not equal to said reference voltage and a second value different from said first value to disable said detector cell from generating said voltage when said picture element data on said monitor line is equal to said reference voltage.

4. An image sensor according to claim 3, wherein said reading out means comprises:
    a video line; and
    a switching element for connecting said source follower to said video line to read out said picture element data.

5. An image sensor according to claim 1, including a plurality of detector cells connected in parallel to said controlling means and said reading out means.

* * * * *